(12) United States Patent
Ha

(10) Patent No.: US 11,568,445 B2
(45) Date of Patent: Jan. 31, 2023

(54) METHOD, SYSTEM, AND NON-TRANSITORY COMPUTER-READABLE RECORDING MEDIUM FOR PROVIDING AN ADVERTISING CONTENT USING A ROBOT

(71) Applicant: Bear Robotics, Inc., Redwood City, CA (US)

(72) Inventor: John Jungwoo Ha, Seoul (KR)

(73) Assignee: Bear Robotics, Inc., Redwood City, CA (US)

( * ) Notice: Subject to any disclaimer, the term of this patent is extended or adjusted under 35 U.S.C. 154(b) by 0 days.

(21) Appl. No.: 17/242,853

(22) Filed: Apr. 28, 2021

(65) Prior Publication Data

US 2022/0351246 A1 Nov. 3, 2022

(51) Int. Cl.
*G06Q 30/00* (2012.01)
*G06Q 30/02* (2012.01)

(52) U.S. Cl.
CPC ..... *G06Q 30/0266* (2013.01); *G06Q 30/0261* (2013.01); *G06Q 30/0281* (2013.01)

(58) Field of Classification Search
None
See application file for complete search history.

(56) References Cited

U.S. PATENT DOCUMENTS

| | | | |
|---|---|---|---|
| 2012/0278178 A1 | 11/2012 | Fung | |
| 2019/0272580 A1* | 9/2019 | Kawamura | G06Q 30/0633 |
| 2020/0202386 A1* | 6/2020 | Fowe | H04W 4/23 |

FOREIGN PATENT DOCUMENTS

| | | | |
|---|---|---|---|
| JP | 2008132568 A | 6/2008 | |
| JP | 2016115257 A | 6/2016 | |
| JP | 2018149645 A | 9/2018 | |
| KR | 10-2011-0004015 A | 1/2011 | |
| KR | 10-10122880000 B1 | 1/2011 | |
| KR | 10-2011-0103537 A | 9/2011 | |

* cited by examiner

*Primary Examiner* — Kambiz Abdi
*Assistant Examiner* — Christopher Stroud
(74) *Attorney, Agent, or Firm* — Dinsmore & Shohl LLP; Yongsok Choi, Esq.

(57) ABSTRACT

A method for providing an advertising content using a robot is provided. The method includes the steps of: determining, with reference to first situation information on a customer in a serving place and second situation information on at least one robot for providing a service in the serving place, an advertising content to be provided for at least one of the customer and the serving place and presentation property information of the advertising content; and providing the advertising content by the at least one robot with reference to the presentation property information.

20 Claims, 8 Drawing Sheets

300

METHOD, SYSTEM, AND NON-TRANSITORY COMPUTER-READABLE RECORDING MEDIUM FOR PROVIDING AN ADVERTISING CONTENT USING A ROBOT

FIELD OF THE INVENTION

The present invention relates to a method, system, and non-transitory computer-readable recording medium for providing an advertising content using a robot.

BACKGROUND

Robots are utilized to replace or assist people in various fields because they can automatically perform difficult tasks or repetitive operations. Recently, various researches are being conducted on techniques for providing advertising contents using such robots.

As an example of related conventional techniques, Korean Registered Patent Publication No. 10-0904509 discloses a robot kiosk comprising: a base body disposed on a floor surface; a robot arm coupled to the base body and having a joint for rotating motion and a joint for bending motion; a display panel connected to an upper part of the robot arm and configured to display an advertising video; a front detection sensor coupled to the base body and configured to detect an approacher entering an area around the base body so that the robot arm is operated to move the display panel closer to the detected approacher; and a speaker coupled to the display panel and configured to output an advertising speech or sound.

However, the techniques introduced so far as well as the above-described conventional technique have only caused a robot to provide a predetermined advertising content via a display or speaker according to a given schedule, and have not specifically addressed dynamically determining an advertising content or a manner of presenting the advertising content with reference to situation information on surroundings.

In this connection, the inventor(s) present a novel and inventive technique for dynamically determining an advertising content and presentation property information of the advertising content in consideration of situation information on a customer in a serving place and situation information on at least one robot for providing a service in the serving place, and providing the advertising content by the at least one robot according to the presentation property information.

SUMMARY OF THE INVENTION

One object of the present invention is to solve all the above-described problems in the prior art.

Another object of the invention is to reflect situation information on a customer in a serving place and situation information on a robot for providing a service in the serving place, so that an advertising content provided for the customer or the serving place and presentation property information of the advertising content are dynamically changed.

Yet another object of the invention is to cause a plurality of robots for providing services to interwork with each other to present advertising contents in various manners.

Still another object of the present invention is to diversify manners of presenting advertising contents to induce attention and interest of customers in a serving place and improve advertising effect of the advertising contents.

The representative configurations of the invention to achieve the above objects are described below.

According to one aspect of the invention, there is provided a method for providing an advertising content using a robot, the method comprising the steps of: determining, with reference to first situation information on a customer in a serving place and second situation information on at least one robot for providing a service in the serving place, an advertising content to be provided for at least one of the customer and the serving place and presentation property information of the advertising content; and providing the advertising content by the at least one robot with reference to the presentation property information.

According to another aspect of the invention, there is provided a system for providing an advertising content using a robot, the system comprising: an advertising content determination unit configured to determine, with reference to first situation information on a customer in a serving place and second situation information on at least one robot for providing a service in the serving place, an advertising content to be provided for at least one of the customer and the serving place and presentation property information of the advertising content; and an advertising content provision unit configured to provide the advertising content by the at least one robot with reference to the presentation property information.

In addition, there are further provided other methods and systems to implement the invention, as well as non-transitory computer-readable recording media having stored thereon computer programs for executing the methods.

According to the invention, it is possible to reflect situation information on a customer in a serving place and situation information on a robot for providing a service in the serving place, so that an advertising content provided for the customer or the serving place and presentation property information of the advertising content are dynamically changed.

According to the invention, it is possible to cause a plurality of robots for providing services to interwork with each other to present advertising contents in various manners.

According to the invention, it is possible to diversify manners of presenting advertising contents to induce attention and interest of customers in a serving place and improve advertising effect of the advertising contents.

DETAILED DESCRIPTION OF THE INVENTION

Figure 1:
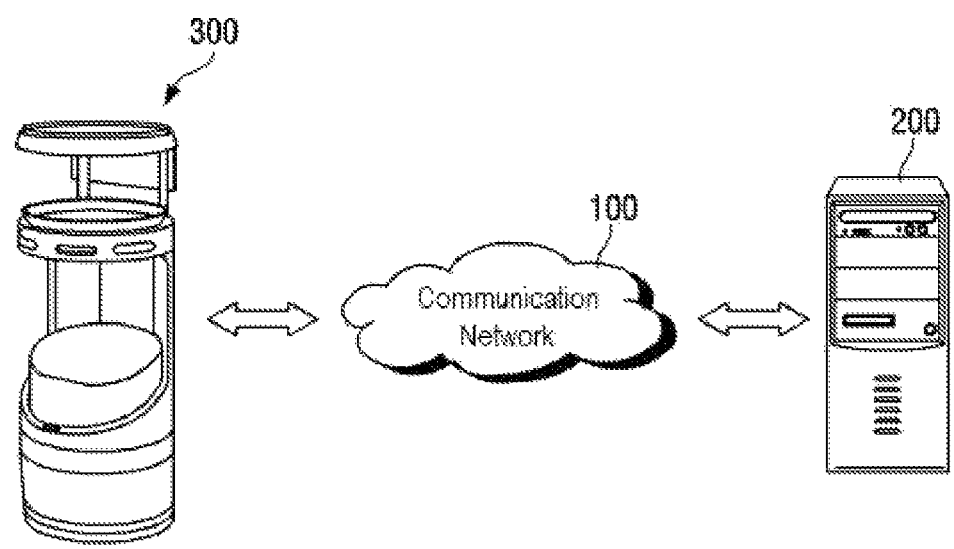
FIG. 1 schematically shows the configuration of an entire system for providing an advertising content using a robot according to one embodiment of the invention.

In the following detailed description of the present invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures and characteristics described herein may be implemented as modified from one embodiment to another without departing from the spirit and scope of the invention. Furthermore, it shall be understood that the positions or arrangements of individual elements within each embodiment may also be modified without departing from the spirit and scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Herein, the term "content" or "contents" encompasses digital information or individual information elements comprised of text, symbol, speech, sound, image, video, and the like, which are accessible via communication networks. For example, such contents may comprise data such as text, image, video, audio, and links (e.g., web links) or a combination of at least two types of such data.

Configuration of the Entire System

FIG. 1 schematically shows the configuration of the entire system for providing an advertising content using a robot according to one embodiment of the invention.

As shown in FIG. 1, the entire system according to one embodiment of the invention may comprise a communication network 100, an advertising content provision system 200, and a robot 300.

First, the communication network 100 according to one embodiment of the invention may be implemented regardless of communication modality such as wired and wireless communications, and may be constructed from a variety of communication networks such as local area networks (LANs), metropolitan area networks (MANs), and wide area networks (WANs). Preferably, the communication network 100 described herein may be the Internet or the World Wide Web (WWW). However, the communication network 100 is not necessarily limited thereto, and may at least partially include known wired/wireless data communication networks, known telephone networks, or known wired/wireless television communication networks.

For example, the communication network 100 may be a wireless data communication network, at least a part of which may be implemented with a conventional communication scheme such as Wi-Fi communication, Wi-Fi Direct communication, Long Term Evolution (LTE) communication, Bluetooth communication (more specifically, Bluetooth Low Energy (BLE) communication), infrared communication, and ultrasonic communication.

Next, the advertising content provision system 200 according to one embodiment of the invention may communicate with the robot 300 to be described below via the communication network 100, and may function to determine, with reference to first situation information on a customer in a serving place and second situation information on at least one robot 300 for providing a service in the serving place, an advertising content to be provided for at least one of the customer and the serving place and presentation property information of the advertising content, and to provide the advertising content by the at least one robot 300 with reference to the presentation property information.

Meanwhile, the above description is illustrative although the advertising content provision system 200 has been described as above, and it will be apparent to those skilled in the art that at least a part of the functions or components required for the advertising content provision system 200 may be implemented or included in the robot 300 to be described below or an external system (not shown), as necessary. Further, in some cases, all of the functions and components of the advertising content provision system 200 may be implemented or included in the robot 300.

Next, the robot 300 according to one embodiment of the invention is a device that may communicate with the advertising content provision system 200 via the communication network 100, and may autonomously perform predetermined functions or assigned tasks (e.g., serving food, retrieving containers, etc.) without any operation of a user. The robot 300 may include at least one of a module (e.g., a grab, a robotic arm module, etc.) for loading and unloading an object (e.g., a food tray), an imaging module (e.g., a visible light camera, an infrared camera, etc.) for acquiring images of surroundings, a display and speaker module for providing adverting contents, and a drive module (e.g., a motor) for moving the robot 300. For example, the robot 300 may have characteristics or functions similar to those of at least one of a guide robot, a transport robot, a cleaning robot, a medical robot, an entertainment robot, a pet robot, and an unmanned flying robot.

Meanwhile, according to one embodiment of the invention, the robot 300 may include an application for providing an advertising content according to the invention. The application may be downloaded from the advertising content provision system 200 or an external application distribution server (not shown).

Configuration of the Advertising Content Provision System

Hereinafter, the internal configuration of the advertising content provision system 200 crucial for implementing the invention and the functions of the respective components thereof will be discussed.

Figure 2:
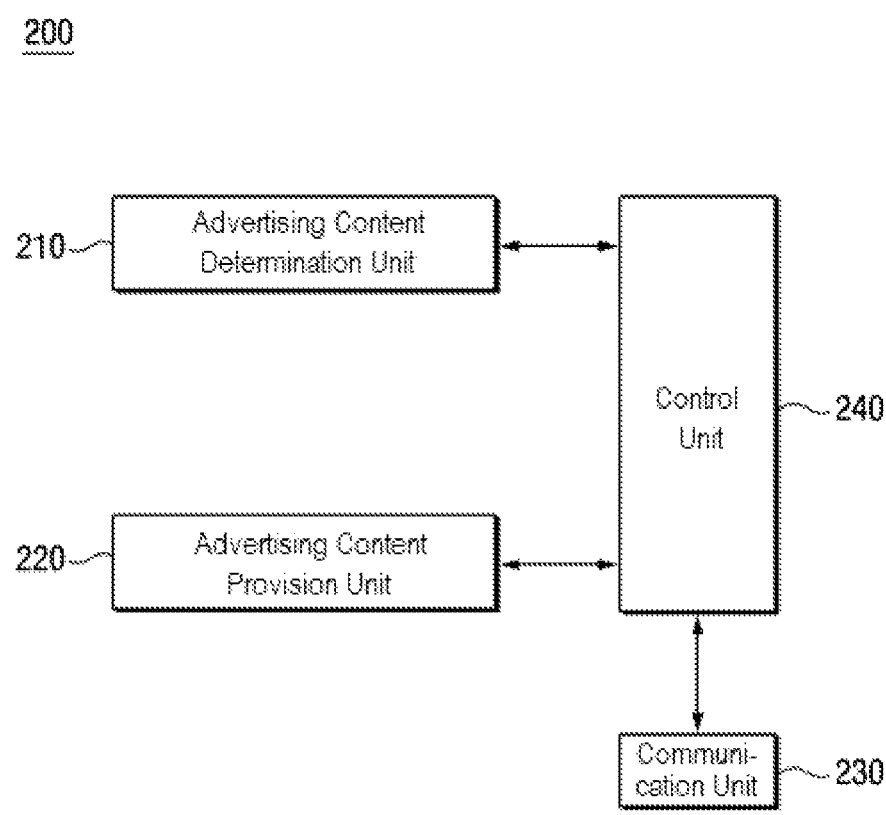
FIG. 2 illustratively shows the internal configuration of an advertising content provision system according to one embodiment of the invention.

FIG. 2 illustratively shows the internal configuration of the advertising content provision system 200 according to one embodiment of the invention.

As shown in FIG. 2, the advertising content provision system 200 according to one embodiment of the invention may comprise an advertising content determination unit 210, an advertising content provision unit 220, a communication unit 230, and a control unit 240. According to one embodiment of the invention, at least some of the advertising content determination unit 210, the advertising content provision unit 220, the communication unit 230, and the control unit 240 may be program modules that communicate with an external system. The program modules may be included in the advertising content provision system 200 in the form of operating systems, application program modules, and other program modules, while they may be physically stored in a variety of commonly known storage devices. Further, the program modules may also be stored in a remote storage device that may communicate with the advertising content provision system 200. Meanwhile, such program modules may include, but are not limited to, routines, subroutines, programs, objects, components, and data structures for performing specific tasks or executing specific abstract data types according to the invention as will be described below.

First, the advertising content determination unit 210 according to one embodiment of the invention may function to determine, with reference to first situation information on a customer in a serving place and second situation information on at least one robot 300 for providing a service in the serving place, an advertising content to be provided for at least one of the customer and the serving place and presentation property information of the advertising content. The first situation information on the customer according to one embodiment of the invention may include information on a gender, age, headcount, type (e.g., couple or family), status (e.g., which may be classified into before, during, and after a meal when the serving place is a restaurant, and may be determined in consideration of time when food is provided to the customer, an average ingestion time for each food (or customer), and the like), intention, and the like of the customer. Further, the second situation information on the at least one robot 300 according to one embodiment of the invention may include information on a number, location, status (e.g., an assigned task), schedule, and the like of the at least one robot (or robot that is (to be) idle). More specifically, the second situation information on the robot 300 may be specified with respect to the robot 300 located within a predetermined distance from a specific customer (e.g., within 20 meters from the customer). Further, the predetermined distance may be specified on the basis of the complexity of the serving place (e.g., which may be specified on the basis of the structure, the number or placement of obstacles, and the number or placement of customers in the serving place), the number or feasible speed of robots, and the like. In addition, the presentation property information of the advertising content according to one embodiment of the invention includes information on how to implement and present the advertising content for the customer or the serving place. For example, the presentation property information may include information on by which presentation means of the robot (or for which sense of the customer among sight, hearing, smell, and touch) the advertising content is to be provided (e.g., via which of a display and a speaker the advertising content is to be presented), which or how many robots are to be used to present the advertising content, and how to place the robots in the serving place to present the advertising content.

Specifically, the advertising content determination unit 210 may determine the advertising content with reference to the first situation information on the customer in the serving place, and may determine the presentation property information of the advertising content with reference to the second situation information on the at least one robot.

For example, the advertising content determination unit 210 may determine an advertising content estimated to be preferred by the customer, among a plurality of advertising contents, as the advertising content to be provided, with reference to a gender, headcount, and type of the customer in the serving place. For example, with reference to tags regarding preferred genders, preferred headcounts, and preferred types (i.e., customer types such as a couple and family) respectively assigned to the plurality of advertising contents, an advertising content matching with the gender, headcount, and type of the customer to a high degree may be determined as the advertising content estimated to be preferred by the customer. Further, the advertising content determination unit 210 may determine an advertising content whose advertising effect in the serving place is estimated to be not less than a predetermined level or an advertising content estimated to be preferred in the serving place, among the plurality of advertising contents, as the advertising content to be provided, with reference to genders, headcounts, and types of a plurality of customers in the serving place. For example, with reference to tags regarding genders subject to great advertising effect, headcounts subject to great advertising effect, and types (i.e., customer types such as a couple and family) subject to great advertising effect respectively assigned to the plurality of advertising contents, an advertising content matching with the genders, headcounts, and types of the plurality of customers in the serving place at or above a predetermined level may be determined as the advertising content whose advertising effect is estimated to be not less than a predetermined level (if necessary, weights may be assigned when the degree of matching is calculated). As another example, with reference to tags regarding preferred genders, preferred headcounts, and preferred types (i.e., customer types such as a couple and family) respectively assigned to the plurality of advertising contents, an advertising content matching with the genders, headcounts, and types of the plurality of customers in the serving place at or above a predetermined level may be determined as the advertising content estimated to be preferred in the serving place (if necessary, weights may be assigned when the degree of matching is calculated). Meanwhile, the advertising content determination unit 210 may determine the advertising content to be provided among the plurality of advertising contents, with reference to a result of learning advertising contents which are preferred by the plurality of customers or preferred in the serving place or which have adverting effect at or above a predetermined level, on the basis of the first situation information on the customers.

Next, the advertising content determination unit 210 may determine, as the presentation property information of the advertising content determined as above, information on a number of sub-contents specified from the advertising content (e.g., specified by dividing the advertising content), placement of the sub-contents in the serving place, and robots 300 and advertising content presentation means (e.g., a display, speaker, etc.) to be used to provide the advertising content or the sub-contents, with reference to a number, placement, or advertising content presentation means of idle robots in the serving place (or within a predetermined distance from the customer). More specifically, when three idle robots 300 (i.e., a first idle robot, a second idle robot, and a third idle robot) capable of providing the advertising content via displays are located within a predetermined distance from the customer, and the advertising content is a combination of a text "Samsung Galaxy" and an image of a specific smart phone model of the Samsung Galaxy brand, the advertising content determination unit 210 may divide the advertising content into three sub-contents (i.e., a text content "Samsung", a text content "Galaxy", and an image content for the specific smart phone model) and determine placement of the sub-contents such that the text content "Samsung", the text content "Galaxy", and the image content for the specific smart phone model are arranged in that order. Further, the advertising content determination unit 210 may determine that the text content "Samsung" is provided by the first idle robot 300, the text content "Galaxy" is provided by the second idle robot 300, and the image content for the specific smart phone model is provided by the third idle robot 300. Meanwhile, the number and placement of the sub-contents specified from the advertising content according to the invention are not necessarily determined in association with (or in correspondence to) the number and placement of the idle robots, and may be diversely changed in consideration of the advertising effect. For example, when the advertising content is divided at or above a predetermined level or at predetermined points, the readability may decrease so that the advertising effect is reduced. Thus, the number and placement of the sub-contents may be determined such that the advertising effect may be equal to or greater than a predetermined level.

Further, the advertising content determination unit 210 according to one embodiment of the invention may determine the advertising content to be provided and the presentation property information of the advertising content, with further reference to information on the serving place where the customer is located. For example, the information on the serving place may include place information of the serving place such as a name, type of business, address, and region of the serving place, and situation information of the serving place such as status of orders in the serving place, status of ingredient supply/demand associated with services provided in the serving place, available menus of the serving place, and an atmosphere of the serving place (e.g., quiet or noisy).

For example, the advertising content determination unit 210 may determine the advertising content to be provided with reference to the first situation information on the customer and the information on the serving place, and may determine the presentation property information of the advertising content with reference to the second situation information on the at least one robot and the information on the serving place.

More specifically, the advertising content determination unit 210 may determine an advertising content associated with the type of business of the serving place, among a plurality of advertising contents determined on the basis of the first situation information on the customer, as the advertising content to be provided, and may determine the presentation property information of the advertising content on the basis of an advertising content presentation means suitable for the atmosphere of the serving place (e.g., the advertising content is provided mainly via video when the atmosphere is quiet, and mainly via sound when the atmosphere is noisy).

Meanwhile, the advertising content determination unit 210 according to the invention may analyze information acquired from various modules, sensors, or systems installed in or interworking with the serving place or the robot 300, thereby acquiring the first situation information on the customer in the serving place, the second situation information on the at least one robot 300 for providing a service in the serving place, and the information on the serving place.

For example, the advertising content determination unit 210 may acquire information on an appearance (e.g., face or body shape) or voice of a customer visiting the serving place using a video or sound module installed in the serving place or the robot 300 and analyze the acquired information to acquire first situation information on the customer. Further, information on time, details, and the like of a service request of the customer may be acquired in conjunction with a video management system (or CCTVs), an inventory management system, a point of sale (POS) information management system, and an enterprise resource planning (ERP) system of the serving place, and the acquired information may be analyzed to acquire the first situation information on the customer.

As another example, the advertising content determination unit 210 may acquire information on a location, status, and the like of the robot 300 in conjunction with a location management system (e.g., the location of the robot may be specified on the basis of a positioning module such as a GPS or IPS installed in the robot 300) and a task management system associated with the robot 300, and analyze the acquired information to acquire the second situation information on the robot.

As yet another example, the advertising content determination unit 210 may acquire the information on the serving place including the place information of the serving place and the situation information of the serving place (e.g., status of orders in the serving place, status of ingredient supply/demand associated with services provided in the serving place, and available menus of the serving place) in conjunction with a geographic information system, a public administration information system, a video management system (or CCTVs), an inventory management system, a POS information management system, and an ERP system.

Next, the advertising content provision unit 220 according to one embodiment of the invention may function to provide the advertising content by the at least one robot 300 with reference to the presentation property information determined by the advertising content determination unit 210.

For example, the advertising content provision unit 220 may cause a robot 300 specified on the basis of the presentation property information, among a plurality of robots 300 in the serving place, to travel to a point in the serving place specified by the presentation property information, and to provide the advertising content when the travel to the point is completed.

As another example, the advertising content provision unit 220 may cause the plurality of robots 300 in the serving place to interwork with each other to provide the advertising content with reference to the presentation property information. More specifically, when the advertising content may be divided into a plurality of sub-contents on the basis of the presentation property information, the advertising content provision unit 220 may cause the plurality of robots 300 to provide the plurality of sub-contents, respectively. That is, when the advertising content may be divided into first to third sub-contents, the advertising content provision unit 220 may cause the first robot 300, the second robot 300, and the third robot 300 to provide the first sub-content, the second sub-content, and the third sub-content, respectively.

Next, according to one embodiment of the invention, the communication unit 230 may function to enable data transmission/reception from/to the advertising content determination unit 210 and the advertising content provision unit 220.

Lastly, according to one embodiment of the invention, the control unit 240 may function to control data flow among the advertising content determination unit 210, the advertising content provision unit 220, and the communication unit 230. That is, the control unit 240 according to one embodiment of the invention may control data flow into/out of the advertising content provision system 200 or data flow among the respective components of the advertising content provision system 200, such that the advertising content determination unit 210, the advertising content provision unit 220, and the communication unit 230 may carry out their particular functions, respectively.

FIGS. 3 to 6B illustratively show situations in which an advertising content is provided using the robot 300 according to one embodiment of the invention.

It may be assumed that a serving place according to the invention is a restaurant, and services associated with the serving place are provided to customers visiting the serving place by a plurality of robots 300a, 300b, 300c, 300d, 300e, and 300f. For example, when the serving place according to one embodiment of the invention is a restaurant, the services associated with the serving place may include services such as reception, order taking, serving, and payment taking.

First, according to one embodiment of the invention, first situation information on the customers in the serving place, second situation information on the plurality of robots 300a, 300b, 300c, 300d, 300e, and 300f for providing services in the serving place, and information on the serving place may be acquired on the basis of information acquired from a video system (or CCTVs) (e.g., which may be operated through imaging modules installed in or interworking with the restaurant or the robot 300), an inventory management system, a POS information management system, and an ERP system of the restaurant, a task management system and a location management system of the robot 300, and the like.

Next, an advertising content to be provided for at least one of the customers and the serving place and presentation property information of the advertising content may be determined with reference to the first situation information on the customers in the serving place and the second situation information on the plurality of robots 300a, 300b, 300c, 300d, 300e, and 300f for providing services in the serving place (and with further reference to the information on the serving place).

Figure 3:
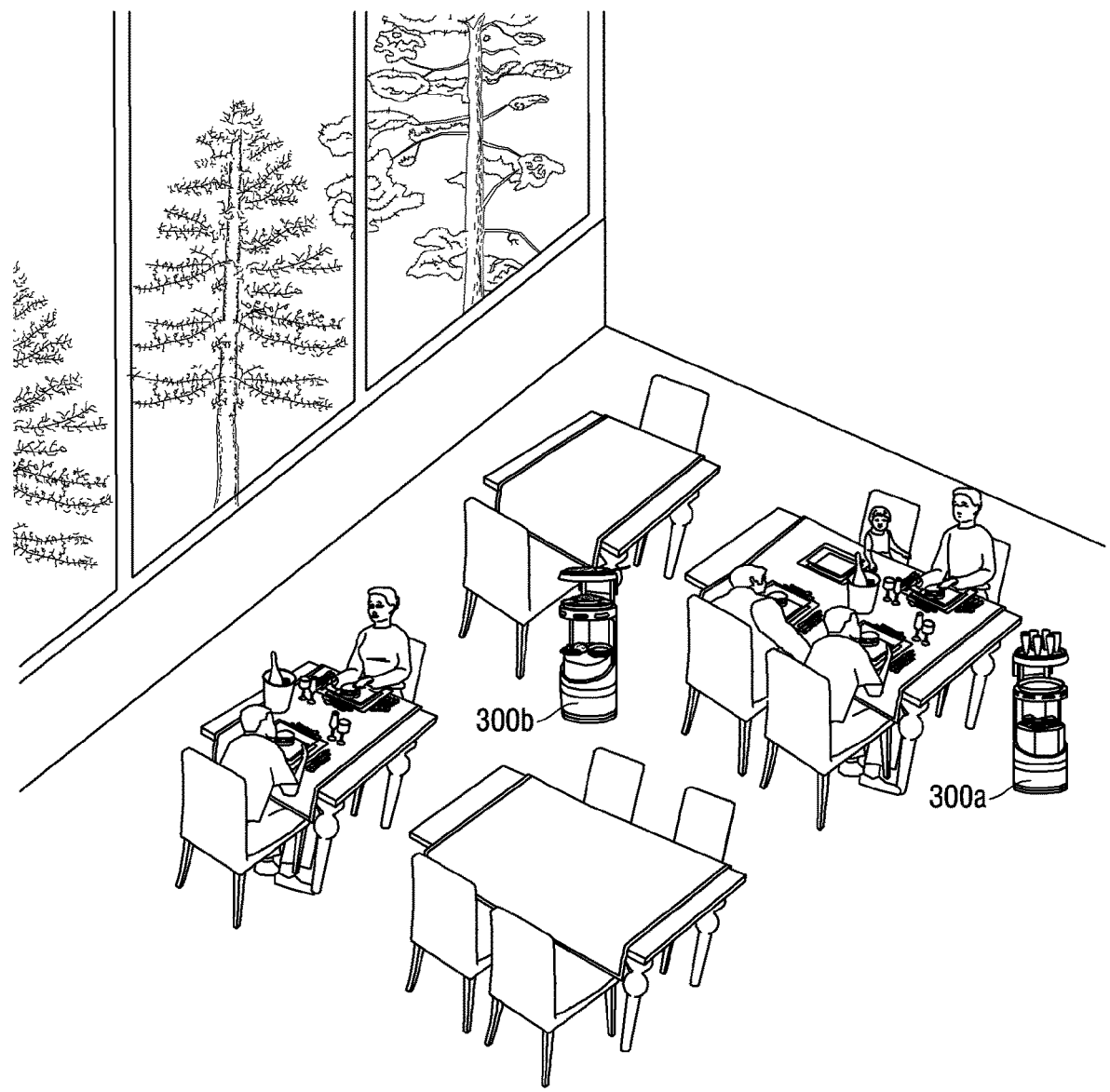
FIG. 3 illustratively shows a situation in which an advertising content is provided using a robot according to one embodiment of the invention.

For example, referring to FIG. 3, information indicating that the headcount of customers at a specific table in the restaurant is 4, the type of the customers is a family including a 5-year-old child, and the customers have not yet ordered meals may be acquired as the first situation information on the customers, using an imaging module of the robot 300a, and information indicating that the first robot 300a is idle and located within a predetermined distance from the table of the customers may be acquired as the second situation information on the robot 300. Next, with reference to the first situation information and the second situation information, an advertising content estimated to be preferred by the customers (i.e., a video content associated with a family set menu for children of the restaurant) among a plurality of advertising contents may be determined as the advertising content to be provided for the customers, and the presentation property information of the advertising content may be determined such that the first robot 300a provides the advertising content toward the customers via video or sound at a point at a predetermined distance from the table.

Figure 4:
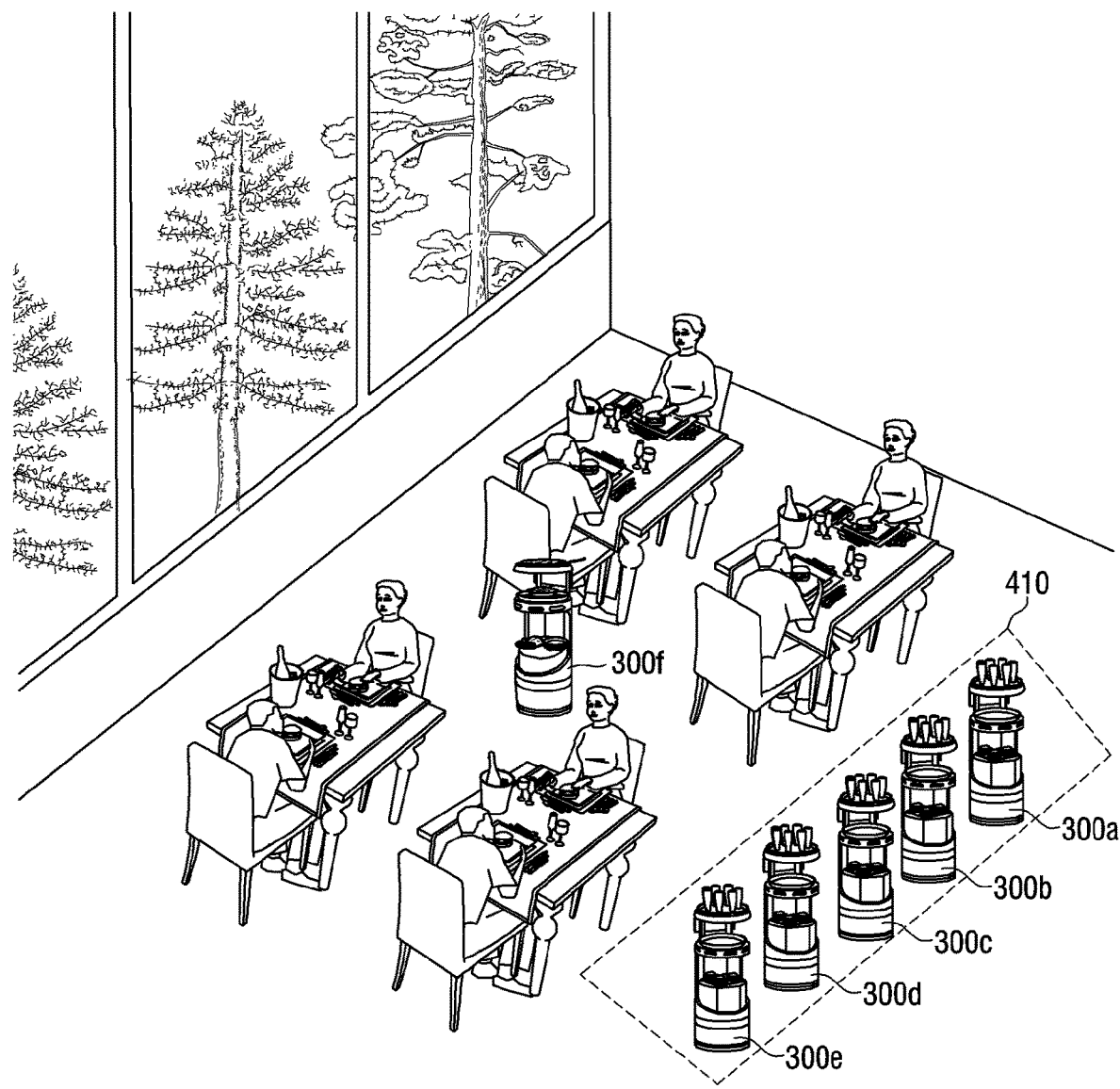
FIG. 4 illustratively shows a situation in which an advertising content is provided using a robot according to one embodiment of the invention.

As another example, referring to FIG. 4, information indicating that all tables in the restaurant are occupied, the type of customers is friends or acquaintances, the customers have an old vehicle (e.g., which may be specified with reference to information on a vehicle of the customers parked at the restaurant), the customers are in 30s, and all of the customers are having meals may be acquired as the first situation information on the plurality of customers, using an imaging module of the at least one robot 300a, 300b, 300c, 300d, and 300e, and information indicating that all of the plurality of robots 300a, 300b, 300c, 300d, and 300e are idle may be acquired as the second situation information on the robot 300. Next, with reference to the first situation information and the second situation information, an advertising content for the Tesla vehicle brand estimated to have advertising effect in the serving place at or above a predetermined level (e.g., a text content "TESLA") among a plurality of advertising contents may be determined as the advertising content to be provided for the serving place, and the presentation property information of the advertising content may be determined such that the plurality of robots 300a, 300b, 300c, 300d, and 300e provide the advertising content via video at a predetermined point 410 in the serving place. More specifically, the presentation property information of the advertising content may be determined such that the first robot 300a provides a text content "T", the second robot 300b provides a text content "E", the third robot 300c provides a text content "S", the fourth robot 300d provides a text content "L", and the fifth robot 300e provides a text content "A" at the predetermined point 410 in the serving place.

Figure 5:
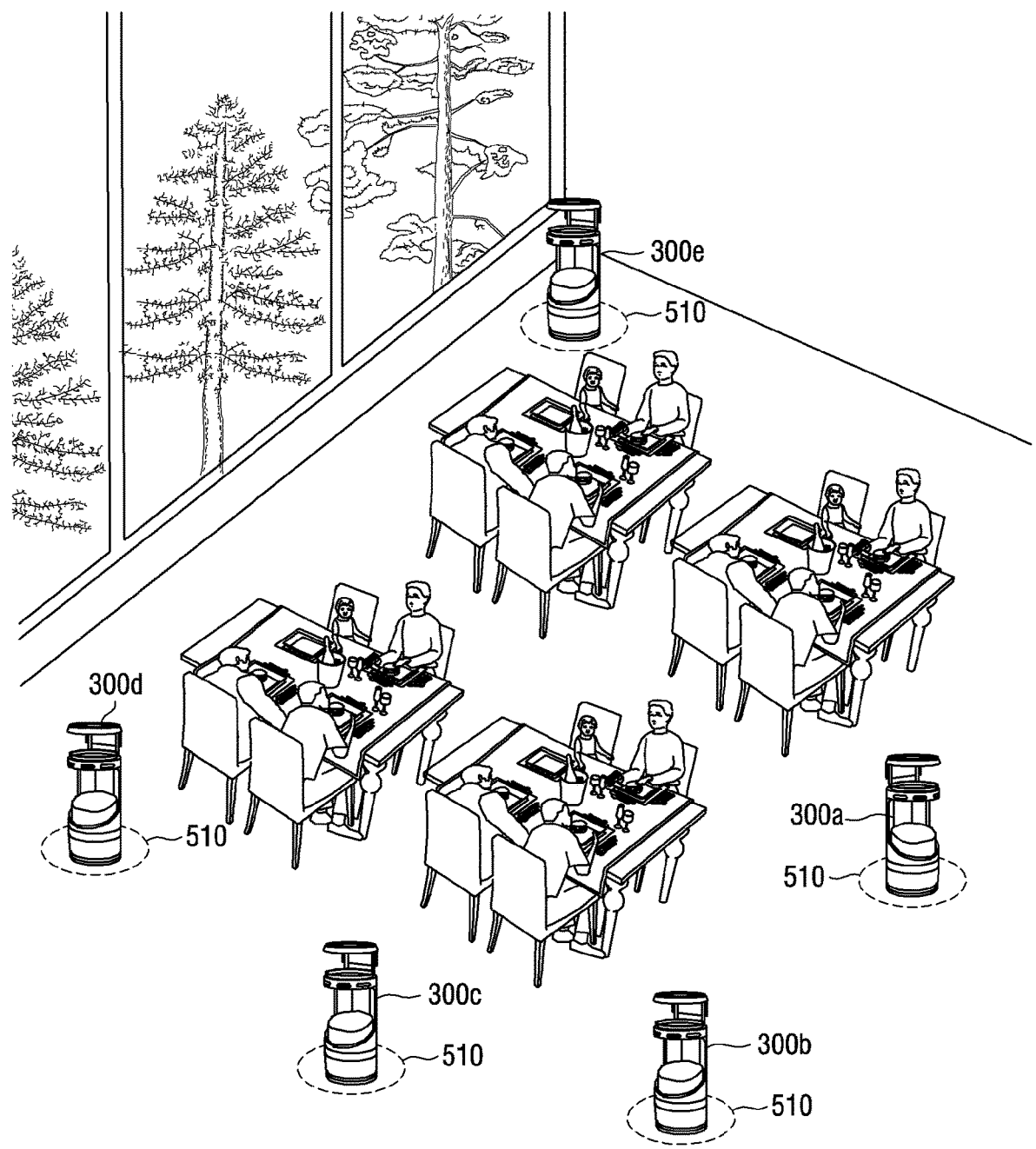
FIG. 5 illustratively shows a situation in which an advertising content is provided using a robot according to one embodiment of the invention.

As yet another example, referring to FIG. 5, information indicating that all tables in the restaurant are occupied, the type of customers is a family including a child, and all of the customers are having meals may be acquired as the first situation information on the plurality of customers, using imaging modules of the plurality of robots 300a, 300b, 300c, 300d, and 300e, and information indicating that all of the plurality of robots 300a, 300b, 300c, 300d, 300e are idle may be acquired as the second situation information on the robot 300. Next, with reference to the first situation information and the second situation information, an advertising content for Pororo toys estimated to be preferred in the serving place (e.g., a sound content for a Pororo animation opening song) among a plurality of advertising contents may be determined as the advertising content to be provided for the serving place, and the presentation property information of the advertising content may be determined such that the plurality of robots 300a, 300b, 300c, 300d, and 300e provide the advertising content in a three-dimensional manner (e.g., with a surround effect) at predetermined separate points 510 in the serving place. More specifically, the presentation property information of the advertising content may be determined such that the first robot 300a, the second robot 300b, the third robot 300c, the fourth robot 300d, and the fifth robot 300e provide the advertising content at the predetermined points 510 in the serving place with different sound phases (which may be associated with the predetermined points 510).

Next, the advertising content may be provided by the plurality of robots 300a, 300b, 300c, 300d, and 300e with reference to the presentation property information of the advertising content.

For example, referring to FIG. 3 again, the first robot 300a may provide a video content associated with a set menu for a family with children among menus of the restaurant via a display of the first robot 300a (e.g., a tablet screen installed in the first robot 300a) at a point adjacent to a table of specific customers, with reference to the determined presentation property information.

Figure 6A:
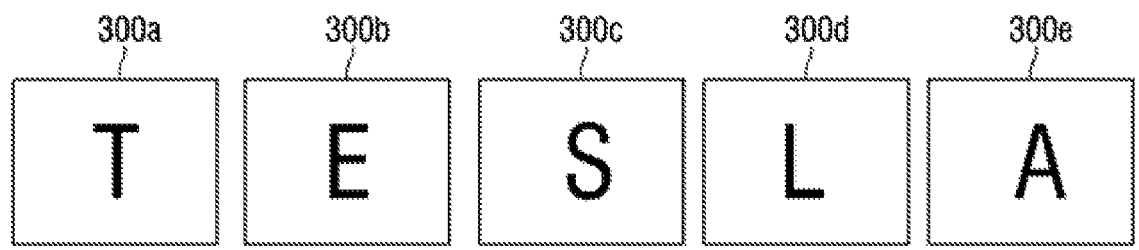
FIG. 6A illustratively shows a situation in which an advertising content is provided using a robot according to one embodiment of the invention.
Figure 6B:
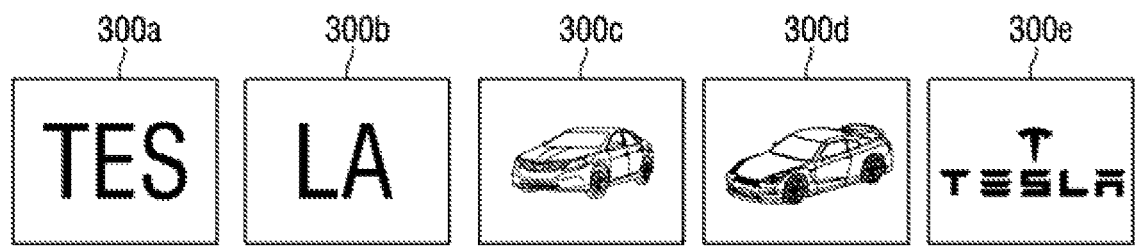
FIG. 6B illustratively shows a situation in which an advertising content is provided using a robot according to one embodiment of the invention.

As another example, referring to FIG. 4 again, an advertising content for the Tesla vehicle brand (e.g., a text content "TESLA") may be divided into a plurality of sub-contents (i.e., text contents for "T", "E", "S", "L", and "A"), and the text contents for "T", "E", "S", "L", and "A" may be provided via displays of the plurality of robots 300a, 300b, 300c, 300d, and 300e traveling to the predetermined point 410 in the serving place, respectively, with reference to the determined presentation property information. That is, the text content "T" may be provided by the first robot 300a, the text content "E" may be provided by the second robot 300b, the text content "S" may be provided by the third robot 300c, the text content "L" may be provided by the fourth robot 300d, and the text content "A" may be provided by the fifth robot 300e. Referring to FIG. 6A, the text contents for "T", "E", "S", "L", and "A" may be provided on the displays of the plurality of robots 300a, 300b, 300c, 300d, and 300e, respectively. Further, referring to FIG. 6B, the advertising content for the Tesla vehicle brand may further include an image content for the Tesla vehicle brand as well as the above text content (i.e., the text content "TESLA"). In this case, a text content "TES", a text content "LA", an image content for a first vehicle model of the Tesla vehicle brand, an image content for a second vehicle model of the Tesla vehicle brand, and an image content for a trademark of the Tesla vehicle brand may be provided on the displays of the plurality of robots 300a, 300b, 300c, 30d, and 300e, respectively.

As yet another example, referring to FIG. 5 again, an advertising content for Pororo toys (e.g., a sound content for a Pororo animation opening song) may be provided via speakers of the plurality of robots 300a, 300b, 300c, 300d, and 300e, respectively, at the predetermined points 510 in the serving place with different sound phases, with reference to the determined presentation property information.

Configuration of the Robot

The robot 300 according to one embodiment of the invention may be a robot performing tasks similar to those performed by at least one of a guide robot, a serving robot, a transport robot, a cleaning robot, a medical robot, an entertainment robot, a pet robot, and an unmanned flying robot, and may be implemented in various forms corresponding to the respective tasks.

Figure 7:
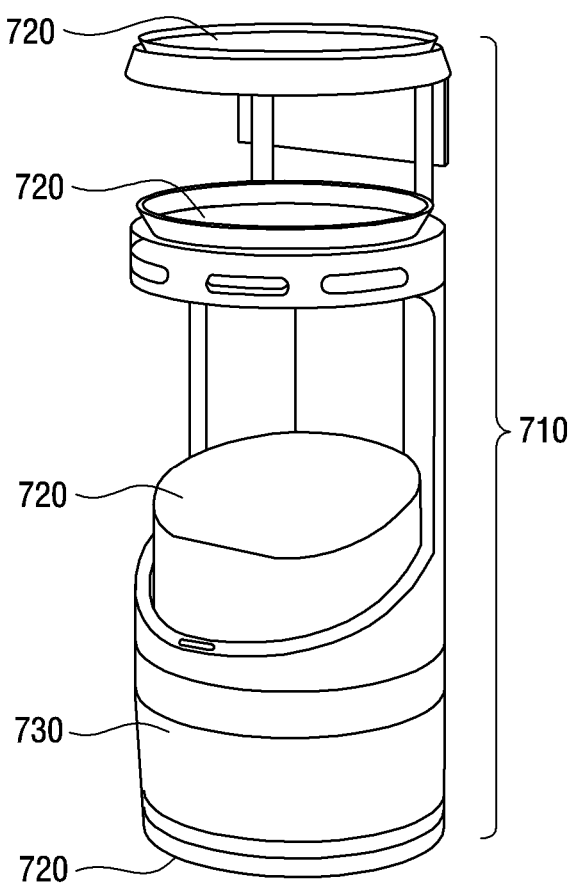
FIG. 7 illustratively shows the structure of a robot according to one embodiment of the invention.

Referring to FIG. 7, the robot 300 may comprise a main body 710, a drive unit 720, and a processor 730.

For example, the main body 710 according to one embodiment of the invention may include at least one loading space for loading an object to be transported or retrieved. The transported or retrieved object according to one embodiment of the invention may refer to all material objects that can be moved, and may encompass things, animals, and people, for example. For example, the transported object may be food and the retrieved object may be a container containing the food.

Figure 8:
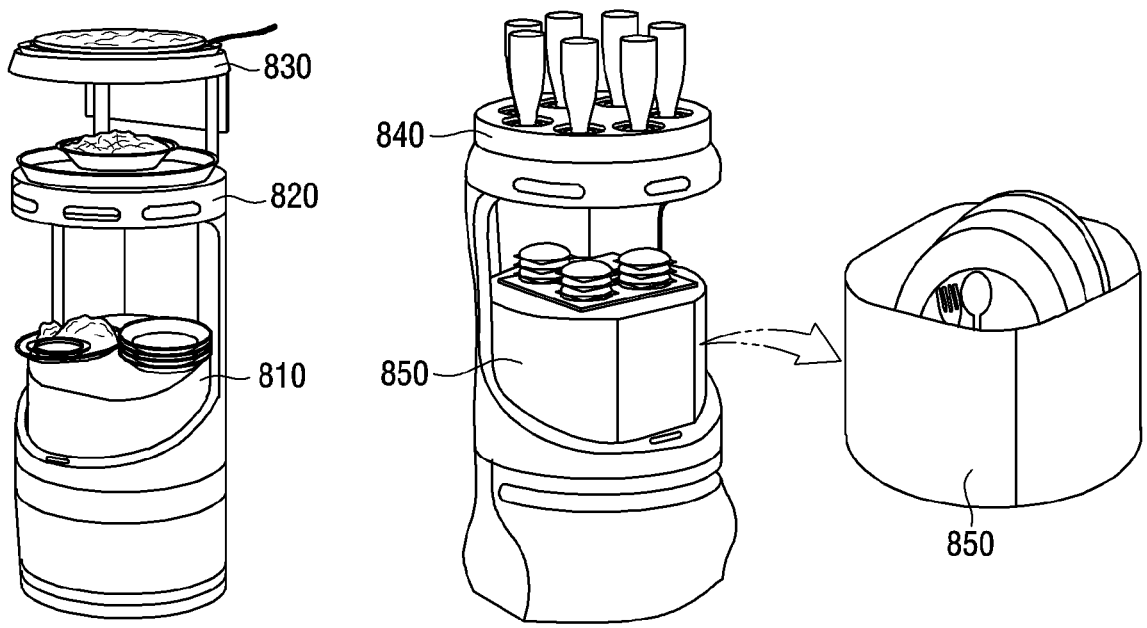
FIG. 8 illustratively shows the structure of a robot according to one embodiment of the invention.

Referring to FIG. 8, when the robot 300 is a serving robot, it may include a first space 810 and a second space 820 for providing the transported object and collecting the retrieved object. Further, the robot 300 may further include a third space 830 that is an expansion space provided via a removable pillar, and more loading spaces may be provided by adding more expansion spaces as needed. Further, the robot 300 may further include a tray 840 dedicated for the transported or retrieved object. For example, the tray 840 may be configured such that a plurality of circular grooves are formed on its top side as seen from the top. Each of the circular grooves may be formed such that the lower part of a cup containing a drink is seated and easily fixed to some extent. The sizes of the circular grooves may be diverse. Further, the lower part of the first space 810 of the robot 300 may include a fourth space 850 that may be taken out through a lateral side of the robot 300. The fourth space 850 according to one embodiment of the invention may have a shape similar to a basket, such that an empty space is formed therein; a lateral side thereof is closed; a top side thereof is open; and a bottom side thereof is closed. However, the loading spaces of the robot 300 according to the invention are not necessarily limited to the above description, and may be diversely implemented as other types of loading spaces as long as the objects of the invention may be achieved.

Meanwhile, referring back to FIG. 7, the main body 710 may further include an imaging module (e.g., a visible light camera, an infrared camera, etc.) (not shown) and a scanner module (e.g., a LIDAR sensor) for acquiring images of surroundings (e.g., customers, tables, employees, other robots 300, etc.) and information on obstacles.

Further, a display provided with a user interface through which a customer or a user of the robot 300 may input various commands and capable of visually providing an advertising content according to the invention (e.g., a tablet) may be attached to the removable pillar of the main body 710. The display according to one embodiment of the invention may communicate with the drive unit 720 or the processor 730 by wire or wirelessly. Here, the position to which the display according to the invention is attached is only an example, and may be diversely changed as long as the objects of the invention may be achieved.

In addition, the upper part or lower part of the main body 710 may further include a speaker capable of outputting a sound associated with a service provided by the robot 300, and acoustically providing an advertising content according to the invention.

Next, the drive unit 720 according to one embodiment of the invention may comprise a module for moving the main body 710 to other locations or a module for loading and unloading the transported and retrieved objects.

For example, the drive unit 720 may include a module related to electrically, mechanically, or hydraulically driven wheels, propellers, or the like as the module for moving the main body 710 to other locations, and may include a robotic arm module for mounting and conveying the transported and retrieved objects as the module for loading and unloading the transported and retrieved objects.

Next, the processor 730 according to one embodiment of the invention may be electrically connected to the drive unit 720 to perform a function of controlling the drive unit 720 (and may include a communication module for communicating with an external system). For example, the processor 730 may be a data processing device that are embedded in hardware and have circuits physically structured to perform codes included in a program or functions represented by instructions. For example, such a data processing device embedded in hardware may include a processing device such as a microprocessor, a central processing unit, a processor core, a multiprocessor, an application-specific integrated circuit (ASIC), and a field programmable gate array (FPGA).

Further, the processor 730 may perform the functions of at least one of the advertising content determination unit 210 and the advertising content provision unit 220 of the advertising content provision system 200 according to the invention (e.g., the corresponding functions may be modularized and included in the processor 730), and may function to control the drive unit 720 through communication with an external system (not shown) that performs the functions of at least one of the advertising content determination unit 210 and the advertising content provision unit 220.

Specifically, the processor 730 may function to determine, with reference to first situation information on a customer in a serving place and second situation information on at least one robot 300 for providing a service in the serving place, an advertising content to be provided for at least one of the customer and the serving place and presentation property information of the advertising content, and to provide the advertising content by the at least one robot 300 with reference to the presentation property information.

Although the embodiments in which the serving place according to the invention is a restaurant have been mainly described above, it is noted that the serving place is not necessarily limited to a restaurant, and may be changed to a cafe, pub, bar, or the like without limitation as long as the objects of the invention may be achieved.

The embodiments according to the invention as described above may be implemented in the form of program instructions that can be executed by various computer components, and may be stored on a computer-readable recording medium. The computer-readable recording medium may include program instructions, data files, and data structures, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler, but also high-level language codes that can be executed by a computer using an interpreter. The above hardware devices may be changed to one or more software modules to perform the processes of the present invention, and vice versa.

Although the present invention has been described above in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

What is claimed is:

1. A method for providing an advertising content using a robot, the method comprising the steps of:
    acquiring first situation information on a customer in a serving place by processing at least one of an image of the customer captured by a video module, a voice of the customer obtained by a sound module, information on time of a service request of the customer, and information on details of the service request of the customer;
    acquiring locations of a plurality of autonomous driving robots for providing services in the serving place on the basis of positioning modules of the plurality of autonomous driving robots;
    acquiring second situation information on the plurality of autonomous driving robots including a distance between each of the locations of the plurality of autonomous driving robots and a location of the customer, wherein the second situation information on the plurality of autonomous driving robots further includes information on whether each of the plurality of autonomous driving robots is located within a predetermined distance from the customer, and wherein the predetermined distance is specified on the basis of a feasible speed of each of the plurality of autonomous driving robots;
    determining, with reference to the first situation information on the customer and the second situation information on the plurality of autonomous driving robots, an advertising content to be provided for at least one of the customer and the serving place and presentation property information of the advertising content;
    dividing the advertising content into a plurality of sub-contents; and
    displaying the plurality of sub-contents on displays of the plurality of autonomous driving robots, respectively, with reference to the presentation property information,
    wherein in the displaying step, the plurality of autonomous driving robots interwork with each other to provide the advertising content.

2. The method of claim 1, wherein in the determining step, the advertising content is determined with reference to the first situation information on the customer, and the presentation property information of the advertising content is determined with reference to the second situation information on the plurality of autonomous driving robots.

3. The method of claim 1, wherein in the determining step, at least one of the advertising content and the presentation property information of the advertising content is determined with further reference to information on the serving place.

4. The method of claim 1, wherein in the determining step, an advertising content estimated to have advertising effect at or above a predetermined level, among a plurality of advertising content, is determined as the advertising content to be provided.

5. The method of claim 1, wherein in the determining step, an advertising content estimated to be preferred by the customer or preferred in the serving place, among a plurality of advertising contents, is determined as the advertising content to be provided.

6. The method of claim 1, wherein the presentation property information includes information on a number of one or more autonomous driving robots to be used to provide the advertising content, among the plurality of autonomous driving robots, and placement of the one or more autonomous driving robots in the serving place.

7. The method of claim 1, wherein in the providing displaying step, an autonomous driving robot specified on the basis of the presentation property information, among the plurality of autonomous driving robots, is moved to a point for providing the advertising content in the serving place.

8. The method of claim 1, wherein the positioning module is a global positioning system (GPS) or an indoor positioning system (IPS).

9. The method of claim 1, wherein:
    the advertising content includes a text portion and an image portion; and
    a first sub-content of the plurality of sub-contents includes the text portion and a second sub-content of the plurality of sub-contents includes the image portion.

10. The method of claim 1, wherein:
    the advertising content includes a text consisting of a plurality of characters; and a first sub-content of the plurality of sub-contents includes a first character of the plurality of characters and a second sub-content of the plurality of sub-contents includes a second character of the plurality of characters.

11. The method of claim 1, wherein each of the plurality of autonomous driving robots includes a motor and a LIDAR sensor.

12. The method of claim 1, wherein the second situation information on the plurality of autonomous driving robots further includes information on whether each of the plurality of autonomous driving robots is idle or not.

13. A non-transitory computer-readable recording medium having stored thereon a computer program for executing the method of claim 1.

14. A system for providing an advertising content using a robot, the system comprising:
an advertising content determination unit configured to:
acquire first situation information on a customer in a serving place by processing at least one of an image of the customer captured by a video module, a voice of the customer obtained by a sound module, information on time of a service request of the customer, and information on details of the service request of the customer;
acquire locations of a plurality of autonomous driving robots for providing services in the serving place on the basis of positioning modules of the plurality of autonomous driving robots;
acquire second situation information on the plurality of autonomous driving robots including a distance between each of the locations of the plurality of autonomous driving robots and a location of the customer,
wherein the second situation information on the plurality of autonomous driving robots further includes information on whether each of the plurality of autonomous driving robots is located within a predetermined distance from the customer, and wherein the predetermined distance is specified on the basis of a feasible speed of each of the plurality of autonomous driving robots;
determine, with reference to the first situation information on the customer and the second situation information on the plurality of autonomous driving robots, an advertising content to be provided for at least one of the customer and the serving place and presentation property information of the advertising content; and
divide the advertising content into a plurality of sub-contents; and
an advertising content provision unit configured to cause the plurality of autonomous driving robots to display the plurality of sub-contents on displays of the plurality of autonomous driving robots, respectively, with reference to the presentation property information,
wherein the advertising content provision unit is configured to cause the plurality of autonomous driving robots to interwork with each other to provide the advertising content.

15. The system of claim 14, wherein the advertising content determination unit is configured to determine the advertising content with reference to the first situation information on the customer, and to determine the presentation property information of the advertising content with reference to the second situation information on the plurality of autonomous driving robots.

16. The system of claim 14, wherein the advertising content determination unit is configured to determine at least one of the advertising content and the presentation property information of the advertising content with further reference to information on the serving place.

17. The system of claim 14, wherein the advertising content determination unit is configured to determine an advertising content estimated to have advertising effect at or above a predetermined level, among a plurality of advertising content, as the advertising content to be provided.

18. The system of claim 14, wherein the advertising content determination unit is configured to determine an advertising content estimated to be preferred by the customer or preferred in the serving place, among a plurality of advertising contents, as the advertising content to be provided.

19. The system of claim 14, wherein the presentation property information includes information on a number of one or more autonomous driving robots to be used to provide the advertising content, among the plurality of autonomous driving robots, and placement of the one or more autonomous driving robots in the serving place.

20. The system of claim 14, wherein the advertising content provision unit is configured to cause an autonomous driving robot specified on the basis of the presentation property information, among the plurality of autonomous driving robots, to move to a point for providing the advertising content in the serving place.

* * * * *